June 25, 1963  W. G. AXTELL  3,094,743
PRESSES
Filed Dec. 16, 1960  4 Sheets-Sheet 1

INVENTOR.
WILLARD G. AXTELL
BY
Horace B. Van Valkenburgh
ATTORNEY

INVENTOR.
WILLARD G. AXTELL

June 25, 1963 W. G. AXTELL 3,094,743
PRESSES
Filed Dec. 16, 1960 4 Sheets-Sheet 3

INVENTOR.
WILLARD G. AXTELL
BY
Horace B. Van Valkenburgh
ATTORNEY

June 25, 1963 W. G. AXTELL 3,094,743
PRESSES
Filed Dec. 16, 1960 4 Sheets-Sheet 4
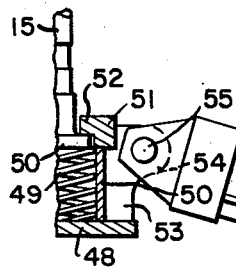
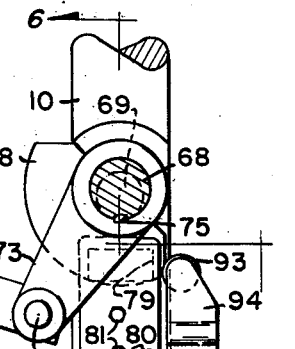
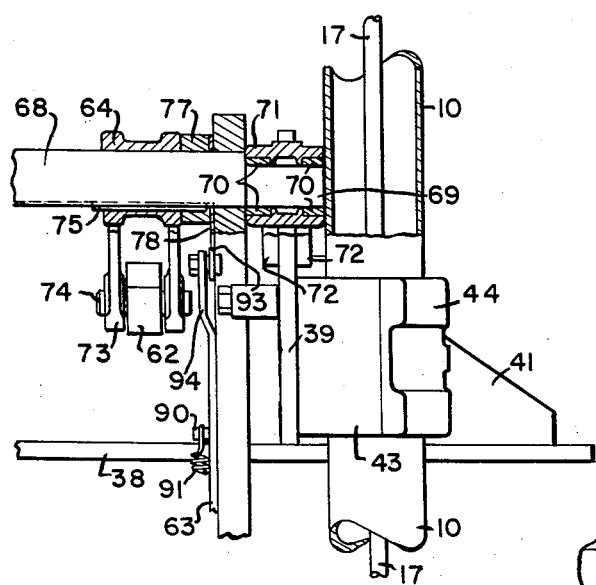
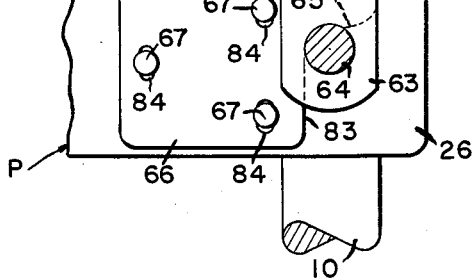
FIG. 5.
FIG. 6.
INVENTOR.
WILLARD G. AXTELL
BY
Horace B. Van Valkenburgh
ATTORNEY United States Patent Office 3,094,743
Patented June 25, 1963

3,094,743
PRESSES
Willard Gmehlin Axtell, Denver, Colo., assignor to Shwayder Brothers, Inc., Denver, Colo., a corporation of Colorado
Filed Dec. 16, 1960, Ser. No. 76,387
7 Claims. (Cl. 18—16)

This invention relates to improvements in presses, and more particularly to presses for making concave shells, such as shells for use in luggage cases and the like.

The press of this invention is particularly adapted to perform the final step in the manufacture of concave fibreglass shells. The preliminary steps are performed by a Brenner or similar machine, which produces fibre glass baskets from fibers produced by chopping fibre glass rovings into lengths, such as about 1½ in. long, then pulling the fibers onto a rotating, inverted basket shaped screen by vacuum. As the fibers adhere to the surface of the screen, they take the concave form of the screen. A small amount of plastic resin is sprayed onto the screen, causing the fibre glass fibers to adhere to each other and the basket to retain its shape during handling. Finally, the fibre glass basket is baked in an oven, to cause the resin to set.

After the fibre glass basket has been formed, it is placed into a mold in the press of this invention. However, a quantity of a suitable resin, such as a "gel-coat," may be first sprayed into the mold, to form the exterior of the shell when completed. Alternatively, a calendered, dough-like sheet containing resin, pigments, fillers and a catalyst, commonly known in the trade as "gunk," may be placed into the mold before the basket. This sheet will form the exterior surface of the fibre glass shell, when completed. Then a quantity of liquid, exothermic resin, such as a polyester resin containing a hydroquionine inhibitor to which a small amount of an organic peroxide, such as 1% of benzoyl peroxide, is added a short time prior to placement in the mold to permit polymerization, is poured into the basket which has been placed in the mold. The upper platen of the press is lowered and secured to the mold by novel locking means, so that an inflatable bag attached to it is received within the basket and mold. The bag is then inflated to a suitable pressure, such as 100 lbs. per square inch, forcing the exothermic liquid resin into and along the interior of the basket. When the basket is approximately 20 by 30 inches, for instance, the press must be able to withstand 60,000 lbs. pressure. The mold and the basket are heated by steam passing through the mold, as to a temperature of 250° to 300° F., to cure the resin and form a solid shell with the fibre glass. This curing process takes perhaps 4 to 5 minutes, after which time the completed shell is removed from the mold.

Among the objects of this invention are to provide a novel press for making concave shells, such as fibre glass and resin shells; to provide such a press which can withstand the necessary pressure but which is of extremely light weight construction; to provide such a press having novel means for locking an upper platen against the mold; to provide such a press which has novel means for releasing the upper platen from the mold; to provide such a press having novel means for controlling the locking and unlocking of a top plate against the mold; to provide such a press which is substantially fully automatic; to provide such a press which has a minimum number of parts to reduce wear and cost of maintenance; and to provide such a press which will be reliable and effective in operation.

Additional objects and the novel features of this invention will become apparent from the description which follows, taken in conjunction with the accompanying drawings, in which:

FIG. 5 is a fragmentary section similar to a portion of FIG. 3, but with the upper platen in lowered position; and FIG. 6 is a fragmentary offset vertical section, and elevation taken along line 6—6 of FIG. 5.

Figure 1:
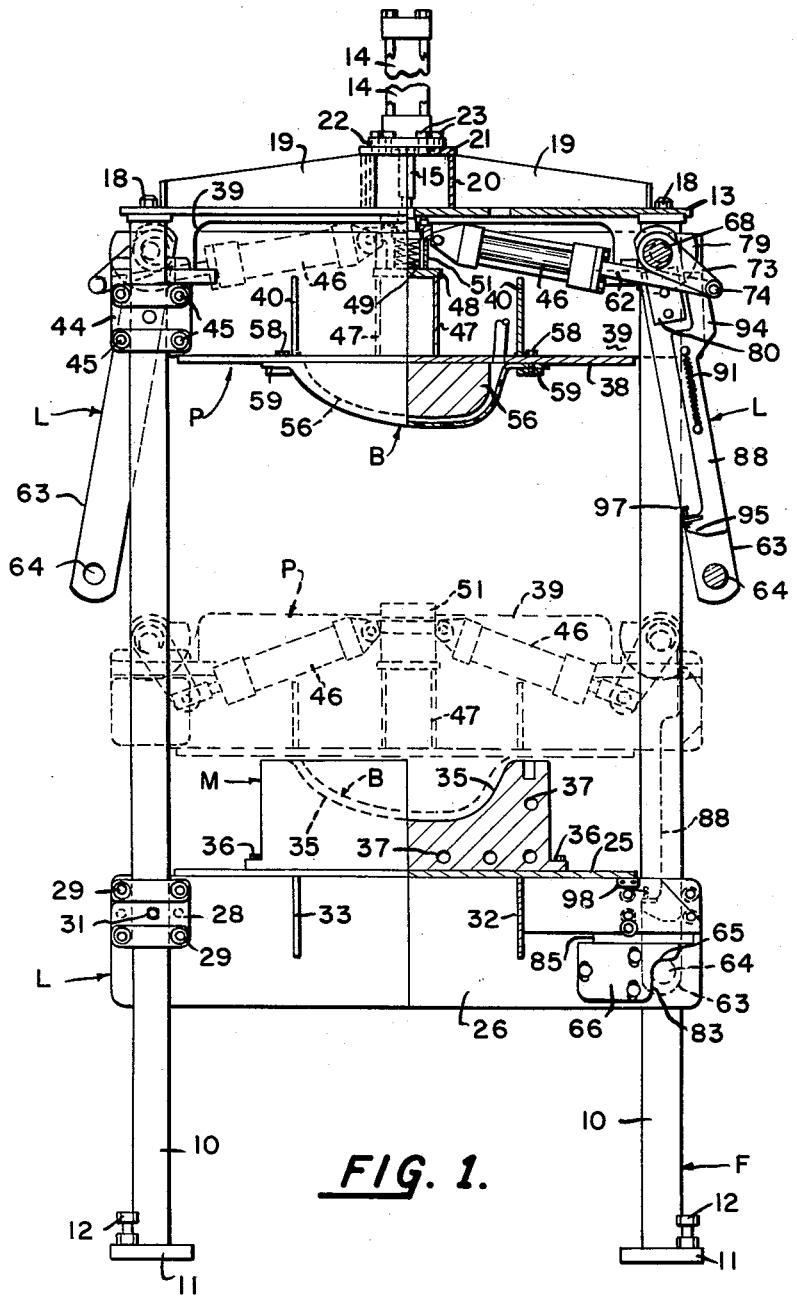
FIG. 1 is a front elevation of a press constructed in accordance with this invention, with the right half thereof in central vertical section and the lower position of an upper platen shown in dotted lines.
Figure 2:
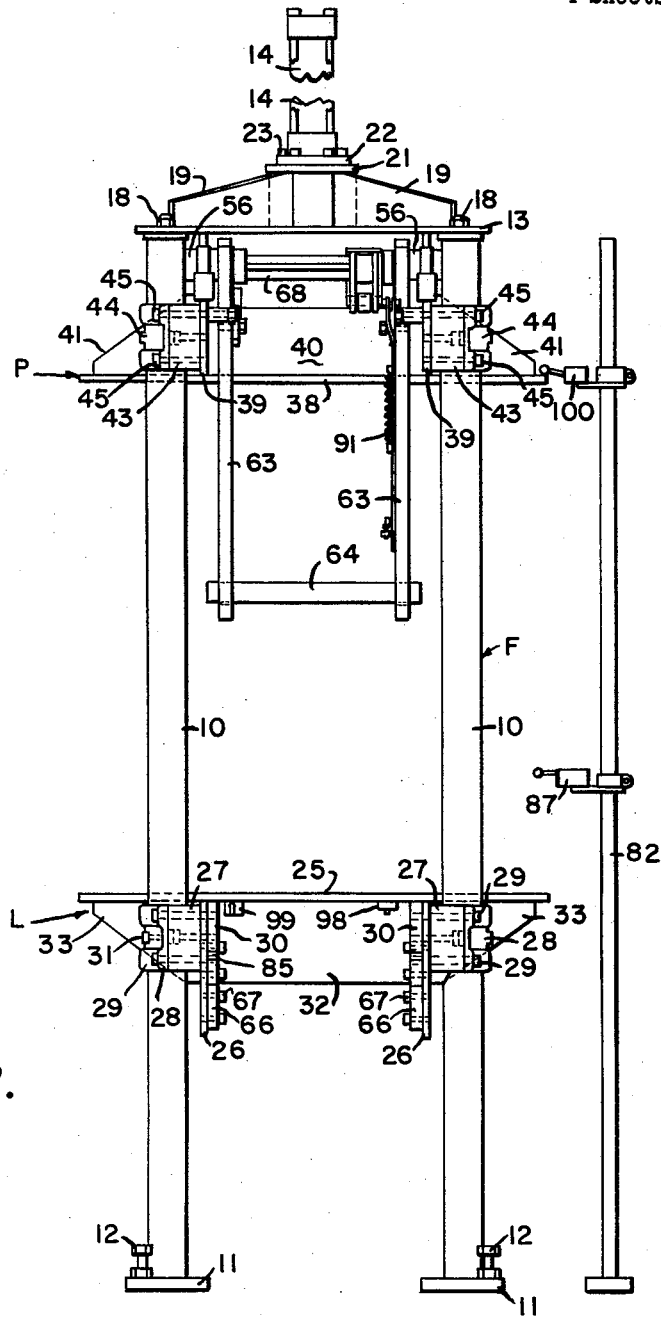
FIG. 2 is an end view of the press of FIG. 1, with a mold and inflatable bag omitted for clarity of illustration.

A press constructed in accordance with this invention, as in FIGS. 1 and 2, includes an upright, generally rectangular frame F, on which is adjustably mounted a lower platen L adapted to support a mold M, and an upper platen P which is movable downwardly and then upwardly along frame F, between the full and dotted positions of FIG. 1. An inflatable bag B is mounted on the underside of upper platen P for reception in mold M during the forming and curing operations. Frame F consists of four spaced posts or tubular columns 10, having flanges 11 at the lower ends thereof which serve as feet to support the press and are fastened to the floor by means of bolts 12. A rectangular roof plate 13 connects the tops of posts 10 and serves as a mounting plate for a hydraulic cylinder 14, the piston rod 15 of which raises and lowers the upper platen P and moves through a central hole 16 in plate 13, as in FIG. 3. The roof plate 13 is secured to the posts by means of rods 17 extending to flanges 11 through columns 10, and are held under tension by means of nuts 18, as in FIG. 4, so that the columns 10 will be under compression to reduce the tension stress on the columns 10. Upwardly extending, reinforcing ribs 19 are attached in diagonal relation to the roof plate 13, as by welding, and extend from adjacent the outer corners thereof inwardly and welded to an annular collar 20, as in FIG. 3, having a centrally apertured, circular disc 21 welded to the upper end thereof, which in turn supports hydraulic cylinder 14, having a lower flange 22 for attachment to disc 21, as by cap screws 23. Ribs 19 conveniently taper outwardly to provide maximum strength at the center of the platen, where it is needed most.

The lower platen L includes a bed plate 25, on which mold M is mounted and which is supported by front and rear, parallel plate beams 26, each of which extend between opposite posts or columns 10. Beams 26 are adjustably attached to the respective post 10 in a suitable manner, as by a clamping bracket which includes a clamp base 27 which engages the inner side of the post and is bolted to beam 26, and a double ribbed cap 28, which engages the outside of the post and is clamped against the post by four bolts 29, which extend through base 27 into tapped holes in beam 25 or also a reinforcing bracket 30, welded to the beam. For ease in adjustment, a set screw 31, in each cap 28, may be utilized for preliminary positioning of the lower platen, prior to final tightening of bolts 29. Bed plate 25 and beams 26 are reinforced by a pair of parallel webs 32, which extend between beams 26, and gussets 33 in corresponding positions outwardly of the beams, each being conveniently welded to the bed plate and beams. The mold M is provided with a recess 35 corresponding in shape to the exterior of the shell to be produced, as in FIG. 1, which may be etched to produce a surface configuration on the shell which will simulate leather or produce any other desired pattern. The mold M is attached to the top of bed plate 25, as by bolts 36, and is heated to a suitable temperature, such as 250° to 300° F., by steam forced through a plurality of passages 37 in the mold.

The upper platen P includes a pressure plate reinforced by upwardly extending, parallel ribs 39, which are cut away at the top at each end, a pair of parallel transverse webs 40, which extend between the ribs, and gussets 41 in corresponding positions outside the ribs, the reinforcements for pressure plate 38 conveniently being welded thereto and to each other. As indicated, the upper platen P slides upwardly and downwardly on posts 10 and for this purpose sliding clamps are utilized, conveniently being similar to the clamps by which the lower platen is attached to the posts, but provided with bushings 42, as in FIG. 4. Thus, a base clamp 43 having a concave recess may be mounted adjacent each end of each rib 39, in position to engage one side of bushings 42, while a concave cap 43 engages the bushings on the opposite side and, as in FIG. 2, is attached to the corresponding base clamp by bolts 45 which extend through the base clamp and into tapped holes in ribs 39.

For transmitting the upward and downward force of piston rod 15 and also to provide points of pivotal attachment above pressure plate 38 of a locking cylinder 46 at each side, the operation of which will be described later, a pair of parallel inner webs 47, as in FIG. 1, extend between ribs 39, while a plate 48 is secured across the top thereof, as by welding. A compression spring 49, which engages the upper surface of plate 48 and is engaged by an annular foot 50 at the lower end of piston rod 15, as in FIG. 3, transmits the force produced by cylinder 14 to the upper platen and also serves to cushion the reaction against piston rod 15 when the upper platen reaches its lower position. Spring 49 is conveniently enclosed by an annular housing 51 attached to the top of plate 48, as by welding, while an annular block 52 is attached to the top of housing 51 and is undercut at the lower inside edge to engage foot 50 of the piston rod, so that the upper platen will be raised when piston rod 15 is retracted. Mounted on plate 48, as by welding, is an upstanding relatively heavy plate 53, which is perpendicular to webs 47, located at the rear side of housing 51 and provided with outwardly extending ears 54 on either side thereof, as in FIG. 3, for pivotally attaching the corresponding locking cylinder 46, as by a pin 55. A wooden block 56, shaped generally to the contour of the inner surface of the fibre glass shell, is attached to the underside of pressure plate 38 near the center thereof, while an inflatable bag B, having a contour similar to that of block 56, is secured to the pressure plate 38 around block 56, as by screws 58 extending through pressure plate 38 and into tapped holes in a clamping ring 59. Bag B is formed of a special rubber or other suitable flexible material adapted to withstand the temperatures involved, while a hose 60 for supplying air under pressure may be connected to an aperture 61, which extends through the pressure plate at a point between the edge of the wooden block 56 and inflatable bag B, so that compressed air may be forced through the aperture, causing the bag to expand and exert the desired pressure, such as 100 lbs. per square inch, on the fibre glass basket and resin to form the fibre glass shell.

In accordance with this invention, a novel locking mechanism L is provided to prevent separation of the pressure plate and mold when the bag is inflated, the locking mechanism receiving the thrust between pressure plate 38 and bed plate 25 during curing of the shell. A locking mechanism L is provided at each side of the press, being closed and opened by extension and retraction, respectively, of piston rod 62 of the corresponding cylinder 46, each locking mechanism L including a pair of parallel relatively heavy arms 63, as in FIG. 2, between the lower ends of which a locking rod 64 extends. Each locking rod 64 extends outwardly from each arm 63, for engagement with a curved notch 65, having a convex outer portion and a concave inner portion, at the outer end of a latch plate 66 when the locking mechanism L is in locked position, as in FIG. 5 and the dotted position of FIG. 1. As in FIGS. 1 and 2, each latch plate 66 is secured to the inside and adjacent the end of a beam 26 of the lower platen, as by cap screws 67 of FIG. 5. In general, cylinders 46 hold the locking arms 63 outwardly as the upper platen moves down, until the lower platen is reached, when hydraulic fluid is supplied to cylinders 46 to retract piston rods 62 and move locking arms 63 inwardly and then upwardly. Each notch 65 is slightly higher on the inside, as in FIG. 5, to provide a depending portion which the corresponding locking rod 64 clears during the inward movement, after which the locking arms 63 are moved upwardly to cause the corresponding end of a locking rod 64 to seat in the inner concave portion of notch 65. After the shell has been formed, the reverse of the above movement is imparted to the locking arms 63. Thus, the locking arms are moved downwardly and then outwardly, so that the end of each locking rod 64 will clear the depending portion of the corresponding notch 65, before moving outwardly. Then, the upper platen can be moved to its upper position, for removal of the formed shell and the production of the next shell.

Figures 3, 4:
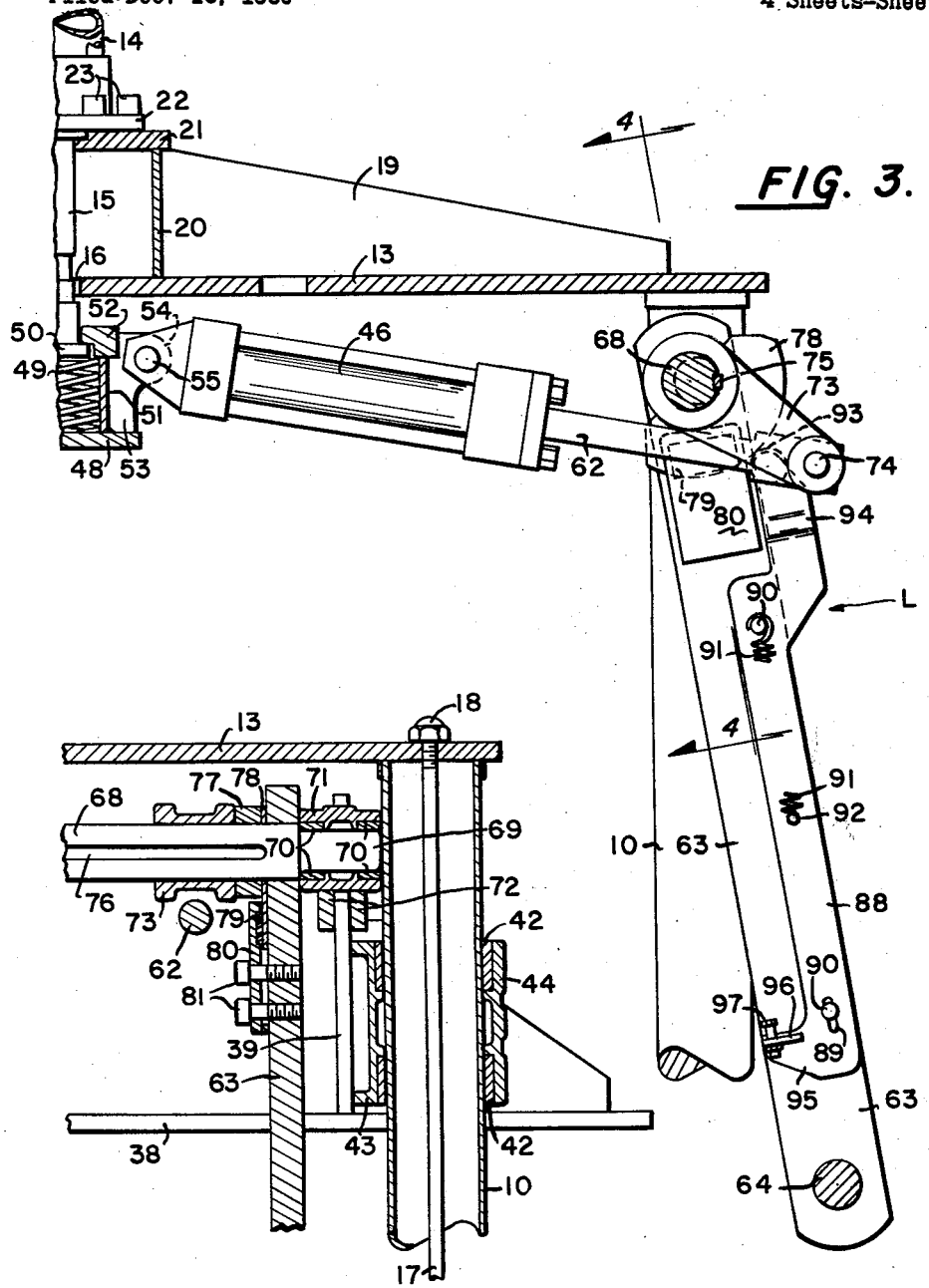
FIG. 3 is a fragmentary central vertical section, on an enlarged scale, of the upper right hand portion of the press of FIG. 1, showing particularly the locking mechanism with the upper platen in raised position.
FIG. 4 is an oblique section, taken along line 4—4 of FIG. 3, showing details of an eccentric shaft mounting.

To impart the above movement to the locking arms 63, each pair of locking arms is pivotal on a shaft 68 having an eccentric 69 at each end, rotatably mounted in a pair of bearings 70, as in FIGS. 4 and 6, mounted in a pillow block 71 which in turn is attached to the end of a rib 39 by brackets 72. As indicated previously, pivotal movement of each shaft 55 is accomplished by a locking cylinder 46, the end of the piston rod 62 of which is pivotally attached to one end of a clevis 73, as by a clevis pin 74. The other end of the clevis is secured to eccentric shaft 68 by a key 75, as in FIG. 3, for which shaft 68 is provided with a keyway 76, as in FIG. 4, so that the shaft will pivot when the clamping cylinder reciprocates the piston rod. The locking arms 63 are not pivoted directly by shaft 68, but through a friction mechanism which includes a block 77 keyed to shaft 68 and having a friction and cam plate 79 welded thereto, with a block 77 and a friction plate 78 being adjacent each locking arm 63 for frictional engagement of plate 78 with a brake lining segment 79 on the inside of a brake shoe 80 mounted on the inside of the locking arm 63 below the shaft 68, as in FIG. 4, as by cap screws 81, so that friction plate 78 will slide between the brake lining and inner side of the locking arm upon pivoting of the eccentric shaft 68, but normally with sufficient frictional force to cause the locking arm to pivot with it. As the upper platen P is lowered, the pressure plate 38, as it reaches the mold M, comes into contact with a limit switch 87, which is conveniently a microswitch, and may be mounted on one of the rear posts 10 or an auxiliary post 82, as in FIG. 2. Switch 87 activates a conveniently solenoid operated control valve, which may be conventional and therefore is not shown, for supplying hydraulic fluid to the outer ends of cylinders 46 through conventional hoses, and thereby cause the cylinders to pull piston rods 62 inwardly, thereby causing the eccentric shaft 68 and the friction plates 78 to pivot simultaneously. Because of the frictional engagement between each friction plates 78 and the corresponding brake shoe 79, the locking arms 63 will pivot inwardly until each locking rod 64 abuts an edge 83 of latch plate 66 below notch 65, which will prevent further pivotal movement inwardly of the locking arms 63, but each friction plate continues to rotate but will slide past the corresponding locking arm and brake shoe, until each locking cylinder reaches the end of its stroke. As will be evident, since the locking arms 63 are mounted on eccentric shafts as the shafts continue to rotate in a clockwise direction, as viewed in FIGS. 3 and 5, the locking arms will be raised upwardly, as to the position of FIG. 5. As in FIG. 5, each latch plate 66 is provided with vertical slots 84 for cap screws 67, to permit readier adjustment of the latch plate. An initial adjustment is made by driving a wedge 85 between the upper edge of latch plate 66 and the lower edge of bracket 30 a sufficient distance that the locking rods 64 will seat firmly against the inner concave surface of notch 65, then cap screws 67 may be tightened.

In further accordance with this invention, a device is provided which automatically causes air to be supplied to inflate bag B when, but not until, locking arms 63 reach locking position. Such a device is conveniently operated by one friction plate 79 on each side, which thus acts as a cam, and includes a bar 88 which is attached to the inside of the corresponding locking arm for sliding movement therealong, as by two spaced longitudinal slots 89 which receive pins 90 extending outwardly from the locking arm. Bar 88 is biased upwardly by a spring 91, to which at one end is attached to bar 88, as at a cap screw 92, and at the other end connected to upper pin 90. This biasing action causes a roller 93 at the outwardly offset and forked upper end 94 of bar 88 to bear against the cam edge of friction plate 79. The inwardly offset, lower end 95 of bar 88 is provided with a laterally extending bracket 96, on which is mounted a bolt 97, the head of which is adapted to engage the activating lever of a switch 98 on each side, conveniently a microswitch and mounted on the under side of bed plate 25. Bolt 97 may, of course, be adjusted to engage switch 98 at the proper time. When the locking cylinders 46 are activated to retract piston rods 63, as discussed above, the locking arms 63 pivot from the position shown in FIG. 3 to that shown in FIG. 5, but in the position of FIG. 3, the cam edge of friction plate 79 will be in engagement with roller 93, thereby holding bar 88 in its lower position, as will be evident from the position of slots 89 relative to pins 90 in FIGS. 3 and 5. Plate 79 will maintain bar 88 in such lower position until after locking arms 63 have been moved inwardly and then upwardly and in fact until each locking cylinder nearly reaches the end of its stroke, at which time the friction plate 79 will be turned just far enough for roller 93 to ride past the end of the cam edge on plate 79 and bar 88 to be moved upwardly by spring 91. This action causes the head of a bolt 97 to engage a microswitch 98 on each side, which thus senses that the press is clamped in closed position and activates a conveniently solenoid operated valve to admit compressed air into the inflatable bag B, as at 100 lbs. per square inch. This pressure is held for a suitable period of time, such as from 4 to 5 minutes, while the fibre glass shell bakes in the heated mold, giving the resin sufficient time to complete polymerization. At the end of this time, a timing device, which is conventional and therefore not shown, causes the air in bag B to be exhausted and then operates conventional controls, such as solenoid operated valves, to supply hydraulic fluid to the inner end of each cylinder 46 to extend piston rods 62, which will turn shafts 68 and also friction and cam plates 78. As plate 78 begins to turn, its cam edge will engage roller 93 to move bar 88 downwardly, so that switch 98 is disengaged by bolt 97 before the locking arms 63 begin to move outwardly. Since the locking arms 63 are in engagement with notch 65, initially the friction plate 78 slides over the brake lining 79 until the eccentric ends of shaft 68 pivot sufficiently to move the locking arms 63 downwardly until the locking rod 64 clears notch 65 of each latch plate 66, the locking arms 63 then being swung outwardly. As the opposite locking arm 63 clears the latch plate 66, it disengages a switch 99, conveniently a microswitch mounted on the underside of bed plate 25, as in FIG. 2 or in any other suitable position, which actuates suitable valves, such as solenoid controlled, to admit hydraulic fluid to the lower end of cylinder 14 and cause the piston rod 15 of cylinder 14 to raise the upper platen. When the upper platen reaches its upper position, pressure plate 38 engages a switch 100, conveniently a microswitch mounted on auxiliary post 82, as in FIG. 2, to close the valve through which the supply of hydraulic fluid to cylinder 14 passes to raise the upper platen, but to maintain sufficient air pressure in cylinder 14 to hold the upper platen U in its upper position. The completed shell is then removed and later trimmed, while the material for forming the exterior surface of the next shell is sprayed or placed in the mold, the next basket and resin placed therein, and a manual switch closed to start upper platen P downwardly, the remainder of the operation being automatic, as described above. Of course, the press may be provided with suitable safety provisions, such as a wire net enclosure and a front gate which is opened for access to the mold but must be closed before the upper platen can be started downwardly.

From the foregoing, it will be evident that a press constructed in accordance with this invention, fulfills to a marked degree the requirements and objects hereinbefore set forth. A light weight press which may withstand pressures, as on the order of 60,000 lbs., by the use of locking arms and a reinforced bed plate and pressure plate, enables the supporting posts and the mechanism for raising and lowering the upper platen to require a minimum of strength and consequently a minimum of weight. As will be evident, the use of locking arms for connecting the upper and lower platens during molding reduces the stress on the supporting framework and the raising and lowering mechanism to a minimum. The press is of simple construction, having a small number of parts, while the locking arms may be securely locked by means of eccentric means which pull the locking arms up into closed position. Since the rotation of the locking arms is accomplished by means of friction clutch plates, engaging a brake shoe on the corresponding locking arm, the shafts may continue to turn to move the locking arms upwardly through the eccentric ends of the shafts, after the locking arms have been pivoted inwardly. Such an arrangement also permits the reverse of the movement of the locking arms to be readily accomplished for unlocking. The edges of the friction plates may also be utilized as cams for actuating a moveable bar on one locking arm on each side, so that a control switch for automatically causing the bag to be inflated and the molding actually started will be actuated only when the locking arms are fully closed. Since the stress on the locking arms is imposed only after the bag is inflated and released when the bag is deflated, the cylinders for moving the locking arms may be relatively light in construction and therefore light in weight. Other controls are readily provided by switches positioned on the press or on an auxiliary support at one side and may be actuated through the operating parts. Thus, the construction for control purposes is simplified. Through such controls, the operation of the press is substantially fully automatic, requiring only a starting button to be pressed manually. Of course, the placement of the basket and resins in the mold is manual, but these operations, as well as the removal of a completed shell, are simple and can be performed quite quickly. Also, since the curing time is several minutes, one operator can handle two or more presses.

It will be understood that the male and female halves of the mold may be interchanges, on the upper and lower platens, particularly if convace and convex metal molds are utilized, with one being pressed against the other by an inflatable bag or diaphragm. Also, other types of molds may be used, various shapes and configurations of articles may be produced and other types of materials may be molded. It will be noted that the press of this invention is particularly useful when the distance required between the mold halves is relatively small when pressure therebetween is to be exerted and the distance required between the mold halves, for removal of a completed article and the insertion of the parts or material to be molded or both, is relatively large.

Although a preferred embodiment of this invention has been illustrated and described, it will be understood that other embodiments may exist and that various changes and variations may be made, without departing from the spirit and scope of this invention.

I claim:

1. A press for molding concave resin and fibre glass shells and the like, comprising a frame having a plurality of upright columns; means interconnecting the tops of said columns; a lower platen fixedly attached to said upright columns at a lower position thereon; a mold mounted on said lower platen; an upper platen mounted on said columns for sliding movement therealong; means mounted on said connecting means for moving said upper platen upwardly and downwardly along said columns; means mounted on the underside of said upper platen for molding an article in cooperation with said mold; a shaft pivotally mounted on each of two opposite sides of said upper platen and having an eccentric portion pivotal with said shaft about the longitudinal axis of said shaft; at least one locking arm pivotally mounted on said eccentric portion of each shaft for movement inwardly and outwardly upon rotation of said shaft and provided at their lower ends with transversely disposed engaging means; means mounted on said upper platten for rotating said shafts to pivot said locking arms inwardly for locking and outwardly for unlocking; and hook means mounted on said lower platen for receiving said engaging means at the lower ends of said locking arms and for terminating the inward movement of said locking arms while said rotating means is still operative, whereby continued rotation of said shaft during locking causes said eccentric portions to urge said engagement means of said locking arms upwardly into said hook means and said hook means prevents outward movement of said locking arms during initial unlocking rotation of said shaft until said rotation causes said eccentric portion to urge said engagement means downwardly and out of engagement with said hook means.

2. A press, as defined in claim 1, wherein said rotating means includes friction drive means frictionally interconnecting each said eccentric portion and locking arm so that said eccentric portion and said shaft may be pivoted through a greater angle than said locking arm during both locking and unlocking.

3. A press, as defined in claim 2, wherein said friction drive means includes a friction plate mounted on said eccentric portion; and a friction lining mounted on said locking arm and engaged by said plate.

4. In a press as defined in claim 2, means controlling said molding means, including a control device movably mounted on one of said arms; and resilient means for urging a portion of said control device against an edge of said friction plate, said friction plate edge being constructed and arranged to act as a cam for moving said control device at a predetermined time during movement of said friction plate.

5. A press, as defined in claim 4, wherein said controlling means includes a switch mounted for actuation by said control device when moved to a predetermined position by said friction plate.

6. A press for molding concave resin and fibre glass shells and the like, comprising a frame having a plurality of upright columns; means interconnecting the tops of said columns; a lower platen fixedly attached to said upright columns at a lower position thereon; a mold mounted on said lower platen; an upper platen mounted on said columns for sliding movement therealong; means mounted on said connecting means for moving said upper platen upwardly and downwardly along said columns; means mounted on the underside of said upper platen for molding an article in cooperation with said mold and including an inflatable diaphragm; means for supplying gas to inflate said diaphragm; locking arms pivotally mounted on said upper platen at each end thereof for movement inwardly and outwardly; means mounted on said upper platen for pivoting said locking arms inwardly and outwardly; means mounted on said lower platen for receiving a portion of said locking locking arms after pivotal movement inwardly; control means for initiating a supply of fluid to said diaphragm only after said locking arms have been moved to locking position; said control means including a switch mounted on said lower platen; including a bar mounted for longitudinal movement along at least one arm; a spring tending to hold said bar in an upper position; a switch actuating member at the lower end of said bar, said switch being mounted so as to be actuated upon upward movement of said actuating member; eccentric means supporting said arm for pivotal movement, said eccentric means when turned in one direction moving said arm upwardly and in the other direction moving said arm downwardly; a friction plate movable with said eccentric means and having a cam edge; a friction lining mounted on said arm and engaged by said plate; and a roller mounted on the upper end of said bar and engageable with said cam edge of said friction plate, thereby permitting said spring to move said arm upwardly and said switch actuating member in position to actuate said switch, after said arm has been pivoted inwardly and then moved upwardly to locking position, said cam edge of said friction plate engaging said roller to move said bar downwardly as said arm is moved downwardly and thereby cause said switch actuating member to clear said switch prior to said arm being moved outwardly.

7. A press for molding concave resin and fibre glass shells and the like, comprising a frame having four upright columns disposed in rectangular relationship; a top plate connecting the tops of said columns; a lower platen including a bed plate mounted on said columns at a lower position and fixedly attached thereto; a mold having a concavity corresponding to the shape of said shell and mounted on said bed plate, said mold having passages therein for a heating fluid; an upper platen including a horizontal pressure plate connected to bearing means engaging said columns for upward and downward movement of said upper platen thereon; a block attached to the underside of said pressure plate in position to enter the cavity of said mold, said block being smaller than but corresponding in shape to said mold cavity; a bag formed of flexible material disposed around said block and attached to the underside of said pressure plate around said block; means for introducing gaseous fluid between said block and said bag to cause said bag to exert pressure against a shell to be molded in said mold; reinforcing members extending upwardly from said pressure plate and to at least adjacent the center thereof; a thrust plate mounted on said reinforcing members at the center of said upper platen; an upright member mounted on said thrust plate at a position offset from the center of said upper platen; a hydraulic cylinder pivotally attached to each opposite end of said last mentioned upright member; a coil spring having its lower end engaging said thrust plate at the center of said upper platen; a fluid cylinder mounted in upright position on said top plate and directly above said spring; a piston within said fluid cylinder; a piston rod attached to said piston and extending downwardly from the lower end of said cylinder; a circular abutment extending laterally from said piston rod and mounted at the lower end thereof, said abutment engaging the upper end of said coil spring; a housing surrounding said coil spring; a block mounted atop said housing and providing with an aperture surrounding said piston rod, said abutment being adapted to engage said block to move said upper platen upwardly upon upward movement of said piston rod; a piston in each said hydraulic cylinder; a piston rod connected to each said piston and extending from the outer end of said hydraulic cylinder; a shaft having eccentric ends mounted at each side of said upper platen; a bearing for each eccentric end of each shaft; a clevis pivotally attached to the outer end of each hydraulic cylinder piston rod and fixedly attached to the corresponding shaft; a pair of locking arms at each side and mounted for pivotal movement on the corresponding shaft, said locking arms being disposed adjacent said upright columns; a friction plate having a circular outer edge of limited arcuate extent secured to each shaft adjacent each locking arm; a block provided with a friction lining mounted on each said locking arm immediately below said shaft, said friction lining being engageable with the corresponding friction plate; a bar having spaced slots and mounted on one locking arm at each side for movement longitudinally thereof, the upper end of each bar being offset outwardly and provided with a roller for engaging the outer edge of the corresponding friction plate; a spring tending to hold said bar in an upper position; a locking rod extending horizontally between the lower ends of each pair of locking arms at each side, each said locking rod extending outwardly beyond said locking arms; said lower platen including a downwardly extending reinforcing member disposed inwardly from the front and rear pairs of columns, respectively; a latch plate mounted on the inside of each said reinforcing member and provided with a notch having an upright inner edge portion and an upper edge which is concave adjacent said upright portion, so as to engage the end of the corresponding end of a locking rod when said locking arms are in locked position, and having a convex portion outwardly from said concave portion; means including a first switch for initiating operation of said hydraulic cylinders to cause retraction of the piston rods thereof when said upper platen has moved downwardly to molding position; said hydraulic cylinder piston rods, upon being retracted, causing said friction plates to pivot said locking arms inwardly, through engagement with said friction linings, but to continue movement past said friction linings when said locking arms have been moved inwardly sufficiently for the ends of said locking rods to engage the upright edge of the corresponding notch, said shafts continuing to turn and the eccentric ends thereof moving said locking arms upwardly until each end of each locking rod engages the inner concave surface of the notch of the corresponding latch plate; an inwardly extending flange at the lower end of each said bar; a switch engaging member mounted on said flange; a pair of second switches mounted on the underside of said bed plate at each side for engagement by said switch engaging members after said locking arms have moved upwardly, said roller at the upper end of each bar then reaching the end of the arcuate edge of the corresponding friction plate and thereby permitting said spring to move said bar upwardly to cause said member to engage said second switch, said cam edge of said friction plate also moving the corresponding bar downwardly as said eccentric ends of the corresponding shaft move said locking arms downwardly, whereby each switch engaging member will clear the corresponding second switch when said locking arms are moved outwardly by engagement of said friction plate with said friction lining; means for initiating the supply of air to said bag upon actuation of said second switches; and a pair of third switches mounted on the underside of said bed plate at each side in position to be engaged by one of said locking arms, said third switches being adapted to produce a signal to prevent the upward movement of said platen by said fluid cylinder and piston rod until said locking arms have been moved outwardly sufficiently to clear said latch plates.

References Cited in the file of this patent

UNITED STATES PATENTS

| | | |
|---|---|---|
| 1,150,484 | Bechman | Aug. 17, 1915 |
| 1,605,031 | Jacobson | Nov. 2, 1926 |
| 1,954,651 | Sherman | Aug. 10, 1934 |
| 2,128,417 | Kerr | Aug. 30, 1938 |
| 2,350,291 | Rincon | May 30, 1944 |
| 2,363,107 | Young | Nov. 21, 1944 |
| 2,449,515 | Seelig | Sept. 14, 1948 |
| 2,569,226 | Carter | Sept. 26, 1951 |